United States Patent
Kurth et al.

(10) Patent No.: US 11,091,642 B2
(45) Date of Patent: *Aug. 17, 2021

(54) POLYMERIZED OILS AND METHODS OF MANUFACTURING THE SAME

(71) Applicant: CARGILL, INCORPORATED, Wayzata, MN (US)

(72) Inventors: Todd Kurth, Maple Grove, MN (US); Christopher Patrick Stevermer, St. Louis Park, MN (US); Hassan Ali Tabatabaee, Plymouth, MN (US)

(73) Assignee: CARGILL, INCORPORATED, Wayzata, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/916,931

(22) Filed: Jun. 30, 2020

(65) Prior Publication Data

US 2020/0325339 A1 Oct. 15, 2020

Related U.S. Application Data

(63) Continuation of application No. 16/079,364, filed as application No. PCT/US2017/019445 on Feb. 24, 2017, now Pat. No. 10,731,037.

(60) Provisional application No. 62/300,497, filed on Feb. 26, 2016.

(51) Int. Cl.
| | | |
|---|---|---|
| *C08L 95/00* | (2006.01) | |
| *C08K 5/11* | (2006.01) | |
| *C08L 91/00* | (2006.01) | |
| *C09D 195/00* | (2006.01) | |
| *C11B 3/00* | (2006.01) | |
| *C11C 1/02* | (2006.01) | |
| *C04B 26/26* | (2006.01) | |

(52) U.S. Cl.
CPC ............. *C08L 95/00* (2013.01); *C04B 26/26* (2013.01); *C08K 5/11* (2013.01); *C08L 91/00* (2013.01); *C11B 3/00* (2013.01); *C11C 1/02* (2013.01); *C08L 2555/82* (2013.01); *Y02A 30/30* (2018.01)

(58) Field of Classification Search
CPC ...... C08L 95/00; C08L 91/00; C08L 2555/82; C11B 3/00; C11C 1/02; C04B 26/26; C08K 5/11; Y02A 30/333
See application file for complete search history.

(56) References Cited

U.S. PATENT DOCUMENTS

| | | | |
|---|---|---|---|
| 4,032,491 | A | 6/1977 | Schoenke |
| 8,101,707 | B2 | 1/2012 | Tenore |
| 2014/0234027 | A1 | 8/2014 | Morris |
| 2014/0305840 | A1 | 10/2014 | Koseoglu |

FOREIGN PATENT DOCUMENTS

| | | | |
|---|---|---|---|
| WO | 2006116578 A2 | | 11/2006 |
| WO | 2011146848 A1 | | 11/2011 |
| WO | 2011146856 A1 | | 11/2011 |
| WO | WO 2015/138958 A1 | * | 3/2015 |
| WO | 2015138958 A1 | | 9/2015 |
| WO | 2016138377 A1 | | 9/2016 |
| WO | 2016138384 A1 | | 9/2016 |
| WO | 2016138390 A1 | | 9/2016 |
| WO | 2016138407 A1 | | 9/2016 |
| WO | 2016149102 A1 | | 9/2016 |

OTHER PUBLICATIONS

Anonymous: "Hildebrand solubility parameter—Wikipedia", Mar. 31, 2017 (Mar. 31, 2017), XP05368056, URL: https://en.wikipedia.org/wiki/Hildebrand_solubility_parameters.
Burke et al: "Solubility Parameters: Theory and Application", The Book and Paper Group Annual, vol. 3, Jan. 1, 1984 (Jan. 1, 1984), pp. 1-37, XP055234917.
Hans Schott: "Solubility parameter and hydrophilic-lipophilic balance of nonionic surfactants", Journal of Pharmaceutical Sciences, vol. 73, No. 6, Jun. 1, 1984 (Jun. 1, 1984), pp. 790-792, XP055055858, ISSN: 0022-3549, DOI: 10.1002/jps.2600730621.
Josefa Bastida-Rodríguez: "The Food Additive Polyglycerol Polyricinoleate (E-476): Structure, Applications, and Production Methods", ISRN Chemical Engineering, vol. 2013, Jan. 1, 2013 (Jan. 1, 2013), pp. 1-21, XP055605653, DOI: 10.1155/2013/124767.
Mieczkowski et al: "Solubility parameter components of some polyols", European Polymer Journal, Pergamon Press Ltd. Oxford, GB, vol. 27, No. 4-5, Jan. 1, 1991 (Jan. 1, 1991), pp. 377-379, XP024055355, ISSN: 0014-3057, DOI: 10.1016/0014-3057(91)90191-P.
R, Wilson et al: "Human Studies on Polyglycerol Polyricinoleate (PGPR)", Food and Chemical Technology., vol. 36, No. 9-10, Sep. 1, 1998 (Sep. 1, 1998), pp. 743-745, XP055605654, GB, ISSN: 0278-6915, DOI: 10/1016/S0278-6915(98)00058-1.

* cited by examiner

*Primary Examiner* — Robert D Harlan

(57) ABSTRACT

Described herein is a polymerized biorenewable, petroleum based, previously modified, or functionalized oil, comprising a polymeric distribution ranging from about 2 to about 80 wt % oligomer content, a hydroxyl value ranging from about 0 to about 400, and an iodine value ranging from about 0 to about 200. Methods of manufacturing the polymerized oil as well as its incorporation into asphalt paving, roofing, and coating applications are also described.

8 Claims, No Drawings

POLYMERIZED OILS AND METHODS OF MANUFACTURING THE SAME

TECHNICAL FIELD

This disclosure relates to polymerized oils and methods for polymerizing oils and blending with asphalt to enhance performance of virgin asphalt and/or pavements containing recycled and/or aged bituminous material.

BACKGROUND

Recent technical challenges facing the asphalt industry have created opportunities for the introduction of agriculture-based products for the overall performance enhancement of asphalt. Such performance enhancements may include expanding the useful temperature interval (UTI) of asphalt, rejuvenating aged asphalt, and compatibilizing elastomeric thermoplastic polymers in asphalt.

SUMMARY

Described herein is a polymerized biorenewable, petroleum based, previously modified, or functionalized oil, comprising a polymeric distribution ranging from about 2 to about 80 wt % oligomer content, a hydroxyl value ranging from about 0 to about 400, and an iodine value ranging from about 0 to about 200. Methods of manufacturing the polymerized oil as well as its incorporation into asphalt paving, roofing, and coating applications are also described.

DETAILED DESCRIPTION

"Acid Value" is a mass of potassium hydroxide needed in mg to neutralize one gram of sample according to AOCS Cd 3d-63. Acid value is a way of quantifying the amount of free fatty acid in a sample and has the units mg KOH/g "Flash Point" or "Flash Point Temperature" is a measure of the minimum temperature at which a material will initially flash with a brief flame. It is measured according to the method of ASTM D-92 using a Cleveland Open Cup and is reported in degrees Celsius (° C.).

"Hydroxyl Value" is the number of mg of KOH equivalent to the hydroxyl content of one gram of test sample, according to AOCS Cd 13-60. The hydroxyl value is given with the units km KOH/g.

"Iodine Value" is a measure of unsaturation and is presented as cg iodine per gram sample according to AOCS Cd 1d-92.

"Oligomer" captures all molecules except for free fatty acid and glycerol (which are defined as monomers).

"Performance Grade" (PG) is defined as the temperature interval for which a specific asphalt product is designed. For example, an asphalt product designed to accommodate a high temperature of 64° C. and a low temperature of −22° C. has a PG of 64-22. Performance Grade standards are set by America Association of State Highway and Transportation Officials (AASHTO) and the American Society for Testing Materials (ASTM).

"Polydispersity Index" (also known as "Molecular Weight Distribution") is the ratio of weight average molecular weight (Mw) to number average molecular weight (Mn). The polydispersity data is collected using a Gel Permeation Chromatography instrument equipped with a Waters 510 pump and a 410 differential refractometer. Samples are prepared at an approximate 2% concentration in a THF solvent. A flow rate of 1 ml/minute and a temperature of 35° C. are used. The columns consist of a Phenogel 5 micron linear/mixed Guard column, and 300×7.8 mm Phenogel 5 micron columns (styrene-divinylbenzene copolymer) at 50, 100, 1000, and 10000 Angstroms. Molecular weights were determined using the following standards:

| Standard | Monoolein | Diolein | Arcol LHT 240 | Triolein | Epoxidized Soybean Oil | Acclaim 2200 | Multranol 3400 | Acclaim 8200 |
|---|---|---|---|---|---|---|---|---|
| Molecular Weight (Daltons) | 356 | 620 | 707 | 878 | 950 | 2000 | 3000 | 8000 |

"Polyglycerol" is defined as an etherification product produced by reactions between glycerin molecules to form polymers. The polymers are formed through a combination of heat, up to 250° C., vacuum, down to 0 Torr, and catalysts, caustic, triflic, acetic acid, and adipic acid, until a desired distribution is achieved.

"Polyglycerol ester" is a polymerized oil made from esterifying fatty acid with polyglycerol either partially or completely consuming the hydroxyl moieties. A combination of temperature (for example, 30-300° C., and more preferably 160-250° C.) and catalysts (for example, alkali hydroxides, sulfonic acids, phosphoric acid, tin chloride, and enzymes) can be used to achieve the final ester.

"Polyol ester" is a polymerized oil made from esterifying fatty acid with a polyol either partially or completely consuming the hydroxyl moieties. A combination of temperature (for example, 30-300° C.) and catalysts (for example, alkali hydroxides, sulfonic acids, phosphoric acid, tin or titatium, and enzymes) can be used to achieve the final ester. Polyglycerol ester is an example polyol ester. Alternatively, similar structures could be derived via etherification. These compositions may also be within the scope of this invention.

"Useful Temperature Interval" (UTI) is defined as the interval between the highest temperature and lowest temperature for which a specific asphalt product is designed. For example, an asphalt product designed to accommodate a high temperature of 64° C. and a low temperature of −22° C. has a UTI of 86. For road paving applications, the seasonal and geographic extremes of temperature will determine the UTI for which an asphalt product must be designed. UTI of asphalt is determined by a series of AASHTO and ASTM standard tests developed by the Strategic Highway Research Program (SHRP) also known as the "Performance Grading" (PG) specification.

Asphalt and Bituminous Materials

For the purpose of this invention asphalt, asphalt binder, and bitumen refer to the binder phase of an asphalt pavement. Bituminous material may refer to a blend of asphalt binder and other material such as aggregate or filler. The binder used in this invention may be material acquired from asphalt producing refineries, flux, refinery vacuum tower bottoms, pitch, and other residues of processing of vacuum tower bottoms, as well as oxidized and aged asphalt from recycled bituminous material such as reclaimed asphalt pavement (RAP), and recycled asphalt shingles (RAS).

Starting Material

An ester or a material that can be esterified or trans-esterified, via one or multiple reaction steps, can be used as the starting material for the polymerization technique described herein. These materials herein will be collectively referred to as the "starting material."

Examples of the starting material can also include, for example, acids, anhydrides, polyols, epoxidized oils, and/or esterified polyols. biorenewable oils or petroleum based oil can be used as the starting oil material.

Petroleum based oil includes a broad range of hydrocarbon-based compositions and refined petroleum products, having a variety of different chemical compositions which are obtained from recovery and refining oils of fossil based original and considered non-renewable in that it takes millions of year to generate crude starting material. This also includes waste/crude streams resulting from petroleum based oil refining processes.

Biorenewable oils includes oils isolated from plants, animals, and algae. Examples of plant-based oils may include but are not limited to soybean oil, linseed oil, canola oil, rapeseed oil, castor oil, tall oil, cottonseed oil, sunflower oil, palm oil, peanut oil, safflower oil, corn oil, corn stillage oil, lecithin (phospholipids) and combinations and crude streams thereof.

Examples of animal-based oils may include but are not limited to animal fat (e.g., lard, tallow) and lecithin (phospholipids), and combinations and crude streams thereof.

Biorenewable oils can also include partially hydrogenated oils, oils with conjugated bonds, and bodied oils wherein a heteroatom is not introduced, for example but not limited to, diacylglycerides, monoacylglycerides, free fatty acids, alkyl esters of fatty acids (e.g., methyl, ethyl, propyl, and butyl), diol and triol esters (e.g., ethylene glycol, propylene glycol, butylene glycol, trimethylolpropane, penta erythritol, sorbitol esters), and mixtures thereof. An example of biorenewable oils may be waste cooking oil or other used oils.

Additional examples of the starting oil materials can include previously modified or functionalized oils. Examples of previously modified oils are those that have been previously vulcanized or polymerized by other polymerizing technologies, such as maleic anhydride or acrylic acid modified, hydrogenated, dicyclopentadiene modified, conjugated via reaction with iodine, interesterified, or processed to modify acid value, hydroxyl number, or other properties. Such modified oils can be blended with unmodified plant-based oils or animal-based oils, fatty acids, glycerin, and/or lecithin. Examples of functionalized oils are those wherein a heteroatom (oxygen, nitrogen, sulfur, and phosphorus) has been introduced.

Polymerization

Polymerization of the starting material to create a polyol ester, in preferred aspects a polygycerol ester, can be achieved by reacting the fatty acid from the starting material (note the starting materials may also be referred to herein as the "fatty acid containing material") with a polyol, respectively. Examples of polyols can include sorbitol, and in preferred aspects, glycerol. In aspects of the invention, the starting material ranges from between about 50 wt % to 90 wt % of a mixture of starting material and polyol. In preferred aspects, the starting oil material ranges from about 80 wt % to 90 wt % of a mixture of starting oil material and polyglycerol/polyol. In most preferred aspects, the starting material ranges from about 83 wt % to 98 wt % of a mixture of starting material and polyol. A catalyst may be added to the mixture preferably in an amount ranging from about 0.05 wt % to 2 wt % of the mixture, and in most preferred aspects about 0.1 wt % of the mixture. Example catalysts can be alkali hydroxides, sulfonic acids, phosphoric acid, tin or titanium, and/or enzymes. The reaction is deemed complete when desired polymerization characteristics are achieved, which are further discussed herein. It shall be understood that the products resulting from polyol synthesis are referred to as the "polymerized oil" herein.

Alternatively or additionally, polymerization can also be achieved through crosslinking with cross-linking agents, for example, polyphosphoric acid (PPA), sulfur, phosphorous or oxygen containing moieties, and/or carboxyl groups, etc. Such crosslinking techniques are further described in International Application PCT/US2016/19767 and U.S. Patent Publication No. 20160369203, both of which are hereby incorporated by reference.

Polyol Ester Synthesis

In some aspects, polyol esters can be made by first calculating the initial acid value (according to AOCS Cd 3d-63) and hydroxyl value (according to AOCS Cd 13-60) of the starting lypophillic moiety (acid, anhydride, ester, etc.) containing material and the polyol. Charges can be calculated so that the reaction product (i.e., polymerized oil) achieves the desired hydroxyl value and saponification or acid value (e.g. in the case of a carboxylic acid starting material, desired acid value ranges from 0 to 50 mg KOH/g and desired hydroxyl value ranges from 0 to 400 mg KOH/g). The starting material and the polyol can be charged to a 1 L flask along with a 0.05-2% (more preferably about 0.1%) charge of potassium hydroxide (0.7 g) to catalyze esterification. It shall be understood the alternative catalysts may be used, for example sodium hydroxide (NaOH), methylsulfonic acid (MSA), p-Toluenesulfonic acid (PTSA), titanium isopropoxide (Ti(iPr)4), tin or titanium (SnCl2), and/or enzymes. The mixture can be heated to a temperature between about 30° C. to about 300° C. (and in preferred aspects between about 160° C. and about 250° C.) while sparging with a gas, preferably nitrogen (at a rate of 1-300 L/hr) to esterify, while a condenser setup can be used to condense any water and fatty distillate carried over from the reaction. The reaction is deemed complete once the molecular weight range and other parameters are within the desired ranges, indicating the level of fatty acid containing material consumption. A secondary charge of fatty material or polyol may be added to achieve the desired acid/saponification (as determined by AOCS Cd 3-25) or hydroxyl values.

Polyglycerol Ester Synthesis

In some aspects, polyglycerol esters can be made by first calculating the initial acid value (according to AOCS Cd 3d-63) and hydroxyl value (according to AOCS Cd 13-60) of the starting material, which comprises fatty acid, and the polyglycerol. Charges can be calculated so that the reaction product (i.e., polymerized oil) achieves the desired hydroxyl value and acid value (desired acid value ranges from 0 to 50 mg KOH/g and desired hydroxyl value ranges from 0 to 400 mg KOH/g). The starting material and the polyglycerol can be charged to a 1 L flask along with a 0.05-2% (more preferably about 0.1%) charge of potassium hydroxide (0.7 g) to catalyze esterification. It shall be understood the alternative catalysts may be used, for example sodium hydroxide (NaOH), methylsulfonic acid (MSA), p-Toluenesulfonic acid (PTSA), titanium isopropoxide (Ti(iPr)4), tin chloride (SnCl2), and/or enzymes (*Candida* Antartica A or B). The mixture can be heated to a temperature ranging from about 30° C. to about 300° C. (and in preferred aspects between about 160° C. and about 230° C.) while sparging with a gas, preferably nitrogen (at a rate of 1-300 L/hr) to esterify, while a condenser setup can be used to condense any water and fatty distillate carried over from the reaction. The reaction is deemed complete once the acid value levels are within the desired range, indicating the level of fatty acid containing material consumption. A secondary charge of fatty material or polyol may be added to achieve the desired acid value or hydroxyl.

Polymerization Characteristics

The polymerization (preferably via the polyglcerol ester synthesis described above) of biorenewable, petroleum-based, previously modified, or functionalized oil is driven until a polymeric distribution having between about 2 wt % and about 80 wt % oligomer content is achieved. Furthermore, the polymerized oil also has a hydroxyl value ranging from about 0 to about 400; and an iodine value ranging from about 0 to about 200. The polydispersity index of the polymerized oil ranges from about 1.0 to about 5.0.

The flash point of the resulting polymerized oil, as measured using the Cleveland Open Cup method, is at least about 100° C. and no more than about 400° C. In some aspects, the flash point of the polymerized oil is between about 200° C. and about 350° C. In other aspects, the flash point of the polymerized oil is between about 220° C. and about 300° C. In yet other aspects, the flash point of the polymerized oil is between about 245° C. and about 275° C. The polymerized oils described herein may have higher flash point than its starting oil material, especially when compared against other polymerization techniques.

The viscosity of the polymerized oil will vary based on the type of starting oil material, but generally ranges from about 1 cSt to about 100 cSt at 100° C.

Furthermore, the polymerized oil can be non-reactive or reactive and have the ability to cross-link before asphalt application and/or during asphalt application.

End-Use Applications

In one aspect, the present invention provides a modified asphalt comprising a blend of 60 wt % to 99.9 wt % of asphalt binder and 0.1 wt % to 40 wt % of the polymerized oil, and a method for making the same. The modified asphalt may be used for road paving or roofing applications.

In another aspect, the present invention provides a modified asphalt comprising a blend of 60 wt % to 99.9 wt % asphalt binder and 0.1 wt % to 40 wt % of the polymerized oil, and a method for making the same, and one or more of the biorenewable, petroleum based, or previously modified or functionalized oils described above, for example: unmodified plant-based oil, animal-based oil, fatty acids, fatty acid methyl esters, gums or lecithin, and gums or lecithin in modified oil or other oil or fatty acid.

Other components, in addition to the polymerized oil, may be combined with an asphalt binder to produce a modified asphalt, for example but not limited to, thermoplastic elastomeric and plastomeric polymers (styrene-butadiene-styrene, ethylene vinyl-acetate, functionalized polyolefins, etc.), polyphosphoric acid, anti-stripping additives (amine-based, phosphate-based, etc.), warm mix additives, emulsifiers and/or fibers. Typically, these components are added to the asphalt binder/polymerized oil at doses ranging from about 0.1 wt % to about 10 wt %.

Asphalt Modification

The declining quality of bitumen drives the need for adding chemical modifiers to enhance the quality of asphalt products. Heavy mineral oils from petroleum refining are the most commonly used modifiers. These mineral oils extend the low temperature limit of the asphalt product by 'plasticizing' the binder, however this also tends to lower the upper temperature limit of the asphalt.

Mineral flux oils, petroleum-based crude distillates, and re-refined mineral oils have been used in attempts to soften the asphalt. Often, use of such material results in a decrease of the high temperature modulus of asphalt more than the low temperature, making the asphalt more prone to rutting at high temperatures. Such effects result in the reduction of the Useful Temperature Interval (UTI).

Mineral flux oils, petroleum-based crude distillates, and re-refined mineral oils often have volatile fractions at pavement construction temperatures (e.g., 150 to 180° C.), generally have lower flashpoints than that of asphalt, and may be prone to higher loss of performance due to oxidative aging.

The polymerized oils and blends described herein are not only viable substitutes for mineral oil, but have also been shown to extend the UTI of asphalts to a greater degree than other performance modifiers, therefore providing substantial value to asphalt manufacturers. The observed increase in UTI using the polymerized oils described herein is a unique property not seen in other asphalt softening additives such as asphalt flux, fuel oils, or flush oils. Typically one grade improvement in either the SHRP Performance Grading (PG) specification or the Penetration grading system used in many countries is achieved with approximately 2 to 3 wt % of the polymerized oil by weight of the asphalt. For example, the increase in UTI seen for approximately 3% by weight addition of the polymerized oil can be as much as 4° C., therefore providing a broader PG modification range such that the lower end temperature can be lower without sacrificing the higher end temperature.

Rejuvenation of Aged Bituminous Material

Asphalt "ages" through a combination of mechanisms, mainly oxidation and volatilization. Aging increases asphalt modulus, decreases viscous dissipation and stress relaxation, and increases brittleness at lower performance temperatures. As a result, the asphalt becomes more susceptible to cracking and damage accumulation. The increasing usage of recycled and reclaimed bituminous materials which contain highly aged asphalt binder from sources such as reclaimed asphalt pavements (RAP) and recycled asphalt shingles (RAS) have created a necessity for "rejuvenators" capable of partially or completely restoring the rheological and fracture properties of the aged asphalt. Aging of asphalt has also been shown to increase colloidal instability and phase incompatibility, by increasing the content of high molecular weight and highly polar insoluble "asphaltene" fraction which may increasingly associate. The use of the polymerized oil described herein are particularly useful for RAP and RAS applications. The polymerized oil described in this document act as a compatibilizer of the asphalt fractions, especially in aged and oxidized asphalt, resulting in a balanced and stable asphalt binder with restored performance and durability.

During plant production the asphalt is exposed to high temperatures (usually between 150 to 190° C.) and exposure to air during which significant oxidation and volatilization of lighter fractions can occur leading to an increase in modulus and a decrease in viscous behavior. The aging process is simulated using a Rolling Thin Film Oven (ASTM D2872) during which a rolling thin film of asphalt is subjected a jet of heated air at about 163° C. for about 85 minutes. The rheological properties are measured before and after the aging procedure using a Dynamic Shear Rheometer following ASTM D7175 using the ratio of the $|G^*|/\sin \delta$ after to before aging, in which $G^*$ is the complex modulus and $\delta$ is the phase angle. The larger the ratio of the ($|G^*|/\sin \delta$) after aging to the (|G*|/sin δ) before aging, the higher the effect of oxidative aging and volatilization on the tested asphalt.

Using this procedure it is shown that asphalts treated with the polymerized oil or blends thereof described in this invention have a lower ratio, thus showing a lower tendency for change in rheological properties as a result of oxidative aging and volatilization.

Accordingly, the polymerized oils described herein have been shown to be capable of rejuvenating aged asphalt binder, and modify the rheological properties of a lesser aged asphalt binder. As a result, small dosages of the polymerized oil can be used to incorporate high content of aged recycled asphalt material into pavements and other applications resulting in significant economic saving and possible reduction in the environmental impact of the pavement through reduction of use of fresh resources.

Elastomeric Thermoplastic Polymer Compatibilization in Asphalt

Asphalt is often modified with thermoplastic elastomeric and plastomeric polymers such as Styrene-Butadiene-Styrene (SBS) to increase high temperature modulus and elasticity, to increase resistance to heavy traffic loading and toughening the asphalt matrix against damage accumulation through repetitive loading. Such polymers are usually used at 3 to 7 wt % dosages in the asphalt and high shear blended into asphalt at temperatures exceeding 180° C. and allowed to "cure" at similar temperatures during which the polymer swells by adsorption of lighter fractions in the asphalt until a continuous volume phase is achieved in the asphalt.

The volume phase of the fully cured polymer will be affected by degree of compatibility of the polymer in the asphalt and the fineness of the dispersed particles, resulting in an increased specific area and enhanced swelling potential through increase of the interface surface between asphalt and polymer.

The polymerized oils described in this document have been shown to be capable of further compatibilizing elastomeric polymer in the asphalt, when the oil is added and blended into the asphalt before the incorporation of the polymer, or the curing stage. This will be especially effective in asphalt binders that are not very compatible with the elastomeric polymer. Furthermore, the oil may contribute to the lighter fractions that swell the polymers during the curing period.

Notably, the polymerized oils described herein may be used to make an emulsion for use in asphalt rejuvenation applications. The emulsion comprises an oil phase and an aqueous phase. The oil phase comprises the polymerized oil described herein and may further comprise of asphalt binder and other additives and modifiers, wherein the oil is about 0.1 to 100 wt % of the oil phase. The aqueous phase often comprises a surfactant and may further comprise natural and synthetic polymers (such as Styrene Butadiene Rubber and latex) and/or water phase thickeners.

The oil phase makes up about 15 to 85 wt % of the emulsion with the aqueous phase making up the remaining balance. It is understood by those skilled in the art that emulsions are sometimes further diluted with water at time of application, thus the effective oil phase content of the diluted emulsion may be reduced indefinitely.

Further contemplated herein is a method comprising applying the emulsion to the surface of an existing pavement or applying the emulsion to treat RAS or RAP and further mixing the treated RAS or RAP with virgin asphalt thereby obtaining a rejuvenated asphalt blend.

The emulsion may also be used as part of a cold patching material, a high performance cold patch or cold mix application that contains recycled asphalt thereby obtaining treated RAS or RAP.

In other aspects, the emulsion may be used for cold-in-place recycling of milled asphalt pavements or hot-in-place recycling of milled asphalt pavements.

Warm Mix Additives and Asphalt

In recent years an increasing portion of pavements are produced using what is commonly referred to as "warm mix additives" to produce "warm mix" asphalt pavements. Warm mix pavements can be produced and compacted at lower production temperatures, require less compaction effort to achieve target mixture density, and as a result can retain the properties necessary for compaction at lower temperature enabling an increase in the maximum haul distance of the asphalt mixture from the plant to the job site.

The different mechanisms through which warm mix additives provide a benefit include increased lubrication of aggregates during asphalt mixture compaction, reduction of the binder viscosity at production temperatures, and better coating and wettability of the aggregates. Thus a diverse range of chemicals and additives may exhibit one or more of the properties attributed to warm mix additives when added to an asphalt mixture.

The polymerized oils described herein can be used as a warm mix additive and/or compaction aid, to achieve a number of the benefits expected from a warm mix additive, including minimum decreasing production and construction temperatures through increase in aggregate lubrication and aggregate wettability. In such an application the additive would be used at dosages preferably in the range of between about 0.1 and 2% by weight of the bitumen.

EXAMPLES

The following examples are presented to illustrate the present invention and to assist one of ordinary skill in making and using same. The examples are not intended in any way to otherwise limit the scope of the invention.

Example 1

A modified asphalt binder comprising:
97.0% by weight of neat asphalt binder graded as PG64-22 (PG 64.9-24.7)
3.0% by weight of a polyglycerol ester asphalt modifier, for which the hydrogenated corn oil fatty acid is melted and charged (588.6 g) to a 1 L flask along with polyglycerol (111.4 g) and a 0.1% charge of potassium hydroxide (0.7 g) to catalyze esterification. The mixture was heated to 230° C. and sparged with Nitrogen to esterify. A condenser setup was used to condense any water and fatty distillate carried over from the reaction. This resulted in a modifier with:
94.86% oligomer content and a Polydispersity index (PDI) of 1.82.
Iodine Value of less than 1 cg $I_2$/g.
Hydroxyl value of 50 mg KOH/g.
Acid value of 6 mg KOH/g.

The modifier was blended into the asphalt after the binder had been annealed at 150° C. for 1 hour. Performance grade tests were performed in accordance to AASHTO M320. The modification resulted in modest low temperature grade improvement, especially for the m-value. The net change in the high and low performance grade resulted in a Useful Temperature Interval was decreased by 4.2° C. Details are shown in Table 1:

TABLE 1

| Binder Name | UTI[1] ° C. | O-DSR[2] ° C. | R-DSR[3] ° C. | S-BBR[4] ° C. | m-BBR[5] ° C. |
|---|---|---|---|---|---|
| Unmodified | 89.6 | 64.88 | 65.88 | −25.8 | −24.7 |
| +3% Oil of Example #1 | 85.4 | 60.51 | 61.33 | −26.7 | −24.9 |

[1]UTI: Useful Temperature Interval, as the difference between the high temperature performance grade and the low temperature performance grade, as determined using AASHTO M320.
[2]O-DSR: The High Temperature Performance Grade of the Unaged ("Original") asphalt binder as measured using a Dynamic Shear Rheometer (DSR) following ASTM D7175 and AASHTO M320.
[3]R-DSR: The High Temperature Performance Grade of the Rolling Thin Film Oven Aged (RTFO, following ASTM D2872) asphalt binder as measured using a Dynamic Shear Rheometer (DSR) following ASTM D7175 and AASHTO M320.
[4]S-BBR: The Low Temperature Performance Grade controlled by the Creep Stiffness parameter ("S"), as measured on an asphalt binder conditioned using both the Rolling Thin Film Oven (ASTM D2872) and Pressure Aging Vessel (ASTM D6521), using a Bending Beam Rheometer following ASTM D6648 and AASHTO M320.
[5]m-BBR: The Low Temperature Performance Grade controlled by the Creep Rate parameter ("m" value), as measured on an asphalt binder conditioned using both the Rolling Thin Film Oven (ASTM D2872) and Pressure Aging Vessel (ASTM D6521), using a Bending Beam Rheometer following ASTM D6648 and AASHTO M320.

Example 2

A modified asphalt binder comprising:
97.0% by weight of neat asphalt binder graded as PG64-22 (PG 64.9-24.7)
3.0% by weight of a polyol ester asphalt modifier, in which 344.1 g of vegetable based polyol (BiOH 2100) and 356.5 g of corn oil fatty acid distillate was added to a 1 L round bottom flask along with a 0.1% charge of potassium hydroxide (0.7 g) to catalyze esterification. The mixture was heated to 230° C. and sparged with Nitrogen to esterify. A condenser setup was used to condense any water and fatty distillate carried over from the reaction. This resulted in a modifier with:
96.20% oligomer content and a Polydispersity index (PDI) of 2.11.
Iodine Value of 100 cg I2/g.
Hydroxyl value of 18 mg KOH/g.
Acid value of 8 mg KOH/g.

The modifier was blended into the asphalt after the binder had been annealed at 150° C. for 1 hour. Performance grade tests were performed in accordance to AASHTO M320. The modification resulted in a 2.2° C. low temperature grade improvement. The net change in the high and low performance grade resulted in a Useful Temperature Interval was decreased by 0.7° C. Details are shown in Table 2:

TABLE 2

| Binder Name | UTI[1] ° C. | O-DSR[2] ° C. | R-DSR[3] ° C. | S-BBR[4] ° C. | m-BBR[5] ° C. |
|---|---|---|---|---|---|
| Unmodified | 89.6 | 64.88 | 65.88 | −25.8 | −24.7 |
| +3% Oil of Example #2 | 88.9 | 61.03 | 61.92 | −27.9 | −29 |

Example 3

A modified asphalt binder comprising:
97.0% by weight of neat asphalt binder graded as PG64-22 (PG 64.9-24.7)
3.0% by weight of a polyglycerol ester asphalt modifier, for which 111 g of polyglycerol and 588.59 g of corn oil fatty acid distillate was added to a 1 L round bottom flask along with a 0.1% charge of potassium hydroxide (0.7 g) to catalyze esterification. The mixture was heated to 230° C. and sparged with Nitrogen to esterify. A condenser setup was used to condense any water and fatty distillate carried over from the reaction. This resulted in a modifier with:
95.52% oligomer content and a Polydispersity index (PDI) of 1.76.
Iodine Value of 112 cg I2/g.
Hydroxyl value of 40 mg KOH/g.
Acid value of 9.6 mg KOH/g.
Hildebrand solubility index of 8.6.

The modifier was blended into the asphalt after the binder had been annealed at 150° C. for 1 hour. Performance grade tests were performed in accordance to AASHTO M320. The modification resulted in a 4.4° C. low temperature grade improvement resulting in a modified binder passing the requirements of a PG58-28. The net change in the high and low performance grade resulted in a Useful Temperature Interval which was nearly unchanged. Details are shown in the table below:

TABLE 3

| Binder Name | UTI[1] ° C. | O-DSR[2] ° C. | R-DSR[3] ° C. | S-BBR[4] ° C. | m-BBR[5] ° C. |
|---|---|---|---|---|---|
| Unmodified | 89.6 | 64.88 | 65.88 | −25.8 | −24.7 |
| +3% Oil of Example #3 | 89.5 | 60.40 | 61.15 | −29.8 | −29.1 |

Example 4

A modified asphalt binder comprising:
97.0% by weight of neat asphalt binder graded as PG64-22 (PG 64.9-24.7)
3.0% by weight of a polyglycerol ester asphalt modifier, for which 107 g of polyglycerol and 593 g of soybean oil fatty acid distillate was added to a 1 L round bottom flask along with a 0.1% charge of potassium hydroxide (0.7 g) to catalyze esterification. The mixture was heated to 230° C. and sparged with Nitrogen to esterify. A condenser setup was used to condense any water and fatty distillate carried over from the reaction. This resulted in a modifier with:
94.71% oligomer content and a Polydispersity index (PDI) of 1.33.
Iodine Value of 100 cg I2/g.
Hydroxyl value of 16 mg KOH/g.
Acid value of 4 mg KOH/g.

The modifier was blended into the asphalt after the binder had been annealed at 150° C. for 1 hour. Performance grade tests were performed in accordance to AASHTO M320. The modification resulted in a 4.9° C. low temperature grade improvement resulting in a modified binder passing the requirements of a PG58-28. The net change in the high and low performance grade resulted in a Useful Temperature Interval which was unchanged. Details are shown in the table below:

TABLE 4

| Binder Name | UTI[1] ° C. | O-DSR[2] ° C. | R-DSR[3] ° C. | S-BBR[4] ° C. | m-BBR[5] ° C. |
|---|---|---|---|---|---|
| Unmodified | 89.6 | 64.88 | 65.88 | −25.8 | −24.7 |
| +3% Oil of Example #4 | 89.6 | 60.03 | 61.33 | −29.6 | −30.3 |

Example 5

A modified asphalt binder comprising:
97.0% by weight of neat asphalt binder graded as PG64-22 (PG 64.9-24.7)
3.0% by weight of a polyglycerol ester asphalt modifier, for which 200.6 g of polyglycerol and 1209.5 g of soybean oil fatty acid distillate was added to a 2 L round bottom flask along with a 0.1% charge of potassium hydroxide (1.4 g) to catalyze esterification. The mixture was heated to 230° C. and sparged with Nitrogen to esterify. A condenser setup was used to condense any water and fatty distillate carried over from the reaction. This resulted in a modifier with:
94.42% oligomer content and a Polydispersity index (PDI) of 1.46.
Iodine Value of 100 cg 12/g.
Hydroxyl value of 16 mg KOH/g.
Acid value of 8 mg KOH/g.

The modifier was blended into the asphalt after the binder had been annealed at 150° C. for 1 hour. Performance grade tests were performed in accordance to AASHTO M320. The modification resulted in a 5.5° C. low temperature grade improvement resulting in a modified binder passing the requirements of a PG58-28. The net change in the high and low performance grade resulted in a Useful Temperature Interval increase of 0.6° C. Details are shown in the table below:

TABLE 5

| Binder Name | UTI[1] ° C. | O-DSR[2] ° C. | R-DSR[3] ° C. | S-BBR[4] ° C. | m-BBR[5] ° C. |
|---|---|---|---|---|---|
| Unmodified | 89.6 | 64.88 | 65.88 | −25.8 | −24.7 |
| +3% Oil of Example #5 | 90.2 | 60.00 | 60.74 | −30.2 | −30.3 |

Example 6

A modified asphalt binder comprising:
97.0% by weight of neat asphalt binder graded as PG64-22 (PG 64.9-24.7)
3.0% by weight of a polyglycerol ester asphalt modifier, for which 200.3 g of polyglycerol and 1086 g of soybean oil fatty acid distillate was added to a 2 L round bottom flask along with 0.8 g of potassium hydroxide to catalyze esterification. The mixture was heated to 230° C. and sparged with Nitrogen to esterify. A condenser setup was used to condense any water and fatty distillate carried over from the reaction. This resulted in a modifier with:
28.43% oligomer content and a Polydispersity index (PDI) of 1.03.
Iodine Value of 120 cg I$_2$/g.
Hydroxyl value of 200 mg KOH/g.
Acid value of 1 mg KOH/g.

The modifier was blended into the asphalt after the binder had been annealed at 150° C. for 1 hour. Performance grade tests were performed in accordance to AASHTO M320. The modification resulted in a 3.8° C. low temperature grade improvement resulting in a modified binder passing the requirements of a PG58-28. The net change in the high and low performance grade resulted in a Useful Temperature Interval decrease of 1.0° C. Details are shown in the table below:

TABLE 6

| Binder Name | UTI[1] ° C. | O-DSR[2] ° C. | R-DSR[3] ° C. | S-BBR[4] ° C. | m-BBR[5] ° C. |
|---|---|---|---|---|---|
| Unmodified | 89.6 | 64.88 | 65.88 | −25.8 | −24.7 |
| +3% Oil of Example #6 | 88.6 | 60.77 | 60.06 | −28.5 | −30.8 |

Example 7

A modified asphalt binder comprising:
97.0% by weight of neat asphalt binder graded as PG64-22 (PG 64.9-24.7)
3.0% by weight of a polyglycerol ester asphalt modifier, for which 311.4 g of polyglycerol and 390.0 g of corn oil fatty acid distillate was added to a 1 L round bottom flask along with a 0.1% charge of potassium hydroxide (0.7 g) to catalyze esterification. The mixture was heated to 230° C. and sparged with Nitrogen to esterify. A condenser setup was used to condense any water and fatty distillate carried over from the reaction. This resulted in a modifier with:
91.54% oligomer content and a Polydispersity index (PDI) of 1.51.
Iodine Value of 100 cg I$_2$/g.
Hydroxyl value of 358 mg KOH/g.
Acid value of 4 mg KOH/g.

The modifier was blended into the asphalt after the binder had been annealed at 150° C. for 1 hour. Performance grade tests were performed in accordance to AASHTO M320. The modification resulted in a 3.2° C. low temperature grade improvement. The net change in the high and low performance grade resulted in a slight Useful Temperature Interval decrease of 0.3° C. Details are shown in the table below:

TABLE 7

| Binder Name | UTI[1] ° C. | O-DSR[2] ° C. | R-DSR[3] ° C. | S-BBR[4] ° C. | m-BBR[5] ° C. |
|---|---|---|---|---|---|
| Unmodified | 89.6 | 64.88 | 65.88 | −25.8 | −24.7 |
| +3% Oil of Example #7 | 89.3 | 61.36 | 61.85 | −27.9 | −29.1 |

Example 8

A modified asphalt binder comprising:
97.0% by weight of neat asphalt binder graded as PG64-22 (PG 64.9-24.7)
3.0% by weight of a polyglycerol ester asphalt modifier, for which 160.7 g of polyglycerol and 542 g of corn oil fatty acid distillate was added to a 1 L round bottom flask along with a 0.1% charge of potassium hydroxide (0.7 g) to catalyze esterification. The mixture was heated to 230° C. and sparged with Nitrogen to esterify. A condenser setup was used to condense any water and fatty distillate carried over from the reaction. This resulted in a modifier with:
94.54% oligomer content and a Polydispersity index (PDI) of 1.58.
Iodine Value of 100 cg I$_2$/g.
Hydroxyl value of 91 mg KOH/g.
Acid value of 5 mg KOH/g.

The modifier was blended into the asphalt after the binder had been annealed at 150° C. for 1 hour. Performance grade tests were performed in accordance to AASHTO M320. The modification resulted in a 3.9° C. low temperature grade improvement resulting in a modified binder passing the requirements of a PG58-28. The net change in the high and low performance grade resulted in a Useful Temperature Interval decrease of 1.1° C. Details are shown in the table below:

TABLE 8

| Binder Name | UTI[1] °C. | O-DSR[2] °C. | R-DSR[3] °C. | S-BBR[4] °C. | m-BBR[5] °C. |
|---|---|---|---|---|---|
| Unmodified | 89.6 | 64.88 | 65.88 | −25.8 | −24.7 |
| +3% Oil of Example #8 | 88.5 | 59.93 | 60.82 | −28.6 | −31.2 |

Example 9

A modified asphalt binder comprising:
97.0% by weight of neat asphalt binder graded as PG64-22 (PG 64.9-24.7)
3.0% by weight of a polyglycerol ester asphalt modifier, for which 123 g of polyglycerol and 575.3 g of soybean oil fatty acid distillate was added to a 1 L round bottom flask along with 0.21 g of hypophosphoric acid, to improve product color, 0.21 g of phosphoric acid, a 0.25 g charge of potassium hydroxide to catalyze esterification. The mixture was heated to 230° C. and sparged with Nitrogen to esterify. A condenser setup was used to condense any water and fatty distillate carried over from the reaction. This resulted in a modifier with:
98.52% oligomer content and a Polydispersity index (PDI) of 1.22.
Hydroxyl value of 13 mg KOH/g.
Acid value of 3 mg KOH/g.

The modifier was blended into the asphalt after the binder had been annealed at 150° C. for 1 hour. Performance grade tests were performed in accordance to AASHTO M320. The modification resulted in a 4.9° C. low temperature grade improvement resulting in a modified binder passing the requirements of a PG58-28. The net change in the high and low performance grade resulted in a Useful Temperature Interval increase of 0.6° C. Details are shown in the table below:

TABLE 9

| Binder Name | UTI[1] °C. | O-DSR[2] °C. | R-DSR[3] °C. | S-BBR[4] °C. | m-BBR[5] °C. |
|---|---|---|---|---|---|
| Unmodified | 89.6 | 64.88 | 65.88 | −25.8 | −24.7 |
| +3% Oil of Example #9 | 90.2 | 60.61 | 61.00 | −29.6 | −29.7 |

The invention claimed is:

1. A modified asphalt comprising a compatibilizing composition, the compatibilizing composition comprising:
   (a) a polyol ester;
   (b) a hydroxyl value ranging from about 0 to about 400; and
   (c) an iodine value ranging from about 0 to about 200;
   wherein the polyol in the polyol ester is derived from sorbitol, polyglycerol, pentaerythritol, a copolymer comprising sorbitol, a copolymer comprising polyglycerol, a copolymer comprising sorbitol and polyglycerol, or a combination thereof.

2. The modified asphalt of claim 1, wherein the polyol is synthetically or derivable from biorenewable sources.

3. The modified asphalt of claim 1, wherein the polyol in the polyol ester is sorbitol, a copolymer comprising sorbitol, or a combination thereof.

4. The modified asphalt of claim 1, wherein the ester in the polyol ester is selected from the group consisting of pentaerythritol esters, sorbitol esters, and combinations thereof.

5. The modified asphalt of claim 1, wherein the polyol ester is a polyglycerol ester.

6. The modified asphalt of claim 1, wherein the Hildebrand Solubility parameter of the polyol ester ranges from about 6 to about 12.

7. The modified asphalt of claim 1 for use in compositions for paving roads.

8. The modified asphalt of claim 1 for use in compositions for roofing materials.

* * * * *